United States Patent [19] [11] 4,416,944
Adur [45] Nov. 22, 1983

[54] COMPOSITE STRUCTURES

[75] Inventor: Ashok M. Adur, Rolling Meadows, Ill.

[73] Assignee: Chemplex Company, Rolling Meadows, Ill.

[21] Appl. No.: 452,872

[22] Filed: Dec. 23, 1982

Related U.S. Application Data

[62] Division of Ser. No. 363,894, Mar. 31, 1982, Pat. No. 4,394,485.

[51] Int. Cl.$^3$ .............................................. B32B 27/00
[52] U.S. Cl. .................................... 428/349; 428/355; 428/441; 428/461; 428/475.8; 428/511; 428/520; 428/522; 428/523
[58] Field of Search ............... 428/523, 522, 520, 511, 428/461, 441, 475.8, 349, 355; 525/74, 78, 193, 71, 75, 76, 77

[56] References Cited

U.S. PATENT DOCUMENTS

| | | | |
|---|---|---|---|
| 3,697,465 | 10/1972 | Joyner et al. .......................... | 525/74 |
| 3,856,889 | 12/1974 | McConnell ............................ | 525/74 |
| 3,868,433 | 2/1975 | Bartz et al. ............................ | 525/74 |
| 3,886,227 | 5/1975 | Vanbrederode ...................... | 625/74 |

FOREIGN PATENT DOCUMENTS 2081723  2/1982  United Kingdom .................. 525/74

*Primary Examiner*—George F. Lesmes
*Assistant Examiner*—E. Rollins Buffalow
*Attorney, Agent, or Firm*—Wood, Dalton, Phillips, Mason & Rowe

[57] ABSTRACT

Compositions of matter having properties that make them strong adhesives to various substrates and especially for adhering polypropylene and polyethylene to various polar substrates. These compositions comprise blends of a graft copolymer of a polyethylene backbone grafted with at least one grafting monomer comprising one or more of polymerizable ethylenically unsaturated carboxylic acids or the anhydrides of such acids blended with a blending resin that is a mixture of one or more high density polyethylenes, one or more linear low density polyethylenes and one or more polypropylenes. The disclosure also includes composite structures comprising one or more substrates and a blend of the above as the adhesive in contact with the substrate or substrates and the method of preparing these composite structures.

37 Claims, No Drawings

COMPOSITE STRUCTURES

This is a division of application Ser. No. 363,894 filed Mar. 31, 1982, now U.S. Pat. No. 4,394,485.

This invention relates to adhesive blends comprising modified polyolefin resins with improved adhesion to substrates and especially polar substrates such as metals, glass, paper, wood and polar polymers such as polyamides, polyureas, polycarbonates, polyurethanes, copolymers of olefins with vinyl esters and with vinyl alcohols, cellulose and its derivatives, etc. These adhesive blend resins can be used in any conventional process for combining dissimilar materials. Examples of these methods are lamination, coextrusion, powder and/or extrusion coating, blow molding, etc., or any combination of these processes. The adhesive blends of this invention also have excellent moisture-barrier properties.

BACKGROUND OF THE INVENTION

It is known that blends of polypropylene (PP) with high density polyethylene (HDPE) or low density polyethylene (LDPE) or ethylene vinyl acetate copolymers (EVA) and with a high density polyethylene grafted with suitable unsaturated carboxylic acids or acid derivatives such as anhydrides give adhesion to polyethylene and other olefins as well as to polar polymers and other substrates as listed above. This is disclosed in copending application Ser. No. 178,355 filed Aug. 15, 1980 and Ser. No. 327,278, filed Dec. 4, 1981, both assigned to the same assignee as the present application.

SUMMARY OF THE INVENTION

The improvements achieved by this invention include the following: excellent bond strength to ethylene-vinyl alcohol copolymer. The adhesion value is 4-6 lbs/in. compared to less than 2 lbs/in. in conventional blends containing a high content of high density polyethylene. The invention results in excellent adhesion to polyolefins such as polypropylene and to high and low density polyethylene, superior moisture barrier properties and excellent adhesion to polyamides and other polar polymers, metals and polar substrates generally.

DESCRIPTION OF THE PREFERRED EMBODIMENTS

A blend is made comprising (A) a high density polyethylene resin (HDPE) of density 0.94 to 0.97 g/cc, (B) a polypropylene resin or a copolymer containing high percentage of propylene units, (C) a low density polyethylene resin (LDPE) of density 0.91 to 0.94 g/cc, and (D) a polyethylene grafted with or containing in its main chain unsaturated or saturated carboxylic acids or acid derivatives such as acid anhydrides, acid chlorides, acid amines, acid imines and the like.

The four component blend gives excellent adhesion to substrates and also provides an excellent moisture barrier. If the application requires even higher moisture barrier characteristics, the high density polyethylene in the blend can be increased but lower adhe-sion to polar substrates results. If the application requires superior adhesion to polypropylene, it is advantageous to increase the content of polypropylene in the blend. If the object is to obtain even better adhesion to polar substrates, and moisture barrier properties are not too critical, a lower amount of high density polyethylene would be needed in the blend.

Examples of the methods of using these blends include coextrusion, lamination, coating or a combination of these methods or any other method known to those skilled in the art.

The invention also includes composite structures comprising substrates and the adhesive blends of this invention. The composite structure can be in the form of films, containers, sheets, bottles, tubes, etc.

The term "unsaturated or saturated carboxylic acids or acid derivatives" includes acids, acid salts with metal, acid esters and anhydrides, acid amines, acid chlorides and bromides and any other acid derivatives of aliphatic, alicyclic, aromatic fused ring, or heterocyclic moieties and copolymers containing these groups.

The unsaturated carboxylic acids or acid anhydrides used as the grafting monomers include compounds such as acrylic acid, methacrylic acid, fumaric acid, maleic acid, maleic anhydride, 4-methyl cyclohex-4-ene-1,2-dicarboxylic acid anhydride, bicyclo(2.2.2)oct-5-ene-2,3-dicarboxylic acid anhydride, 1,2,3,4,5,8,9,10-octahydronaphthalene-2,3-dicarboxylic acid anhydride, 2-oxa-1,3-diketospiro(4.4)non-7-ene, bicyclo(2.2.1)hept-5-ene-2,3-dicarboxylic acid anhydride, maleopimaric acid, tetrahydrophthalic anhydride, x-methylbicyclo(2.2.1)hept-5-ene-2,3-dicarboxylic acid anhydride, x-methylnorborn-5-ene-2,3-dicarboxylic acid anhydride, norborn-5-ene-2,3-dicarboxylic acid anhydride, Nadic anhydride, methyl Nadic anhydride, Himic anhydride, methyl Himic anhydride and other fused ring monomers described in U.S. Pat. Nos. 3,873,643 and 3,882,194, both assigned to the assignee hereof.

Cografting monomers as described in U.S. Pat. No. 3,882,194 are also useful for preparing the graft copolymers of this invention.

Included among the conjugated unsaturated esters suitable for cografting are dialkyl maleates, dialkyl fumarates, dialkyl itaconates, dialkyl mesaconates, dialkyl citraconates, alkyl acrylates, alkyl crotonates, alkyl tiglates and alkyl methacrylates where alkyl represents aliphatic, aryl-aliphatic and cycloaliphatic groups containing 1-12 carbon atoms. Esters particularly useful in the cografted copolymers of this invention are dibutyl maleate, diethyl fumarate and dimethyl itaconate. Among the acids and acid anhydrides particularly useful in the cografted copolymers of this invention are maleic anhydride, fumaric acid, x-methylbicyclo(2.2.1-)hept-5-ene-2,3-dicarboxylic acid anhydride and bicyclo(2.2.1)hept-5-ene-2,3-dicarboxylic acid anhydride.

The term "low density polyethylene" used as blend component (C) includes high-pressure low density polyethylene as well as low-pressure linear low density polyethylene. It is preferable to have a resin density in the range 0.91 to 0.94 g/cc and a melt index of 0.1 to 50 g/10 min. The melt indices given here are as determined by ASTM Test Procedure D 1238. Low-pressure linear low density polyethylene is preferred.

Adhesive blends of this invention can be used in composites containing polar substrates such as nylon, ethylene vinyl alcohol copolymers (EVOH), polyvinyl alcohol (PVA), polyester, polyurethane, metals, etc. These compositions can be just two layers or they can be three or more layers with materials which adhere to either layer being added to the structure. For instance, polyolefins like polyethylene (PE), ethylene vinyl acetate copolymers (EVA) or ethylene copolymers with other monomers, ionomers and polypropylene (PP) can be used in these layers. It is obvious that many combinations can be made by one skilled in the art of using the principles disclosed.

Some examples of these composites are PE/adhesive of this invention/nylon, PE/adhesive/ethylene-vinyl alcohol copolymer, PE/adhesive/aluminum, PE/adhesive/steel, PE/adhesive/glass, PE/adhesive/wood, PE/adhesive/leather, PE/adhesive/nylon/adhesive/PE, and PE/adhesive/EVOH/adhesive/PE. Some examples of composites involving other polyolefins are EVA/adhesive/nylon, ionomer/adhesive/nylon, PP/adhesive/nylon. Obviously, many other combinations of polyolefins and polar substrates can be prepared by one skilled in the art using the principles described above.

Examples of other metal combinations are aluminum/adhesive/aluminum or adhesive/aluminum/adhesive or polyethylene/adhesive/aluminum/adhesive/polyethylene. Other metals such as copper, steel, brass, etc. can also be used. Dissimilar metal examples are: aluminum/adhesive/copper, aluminum/adhesive/steel, aluminum/adhesive/brass, etc. One could also have combinations in which one has a metal/adhesive/polar polymer. Examples of these would be aluminum/adhesive/nylon or aluminum/adhesive/EVOH, or steel/adhesive/nylon/adhesive/steel. Here again, one skilled in the art can find a number of obvious combinations from the principles described above.

These materials can be used to manufacture many different useful articles. They can be used as packaging film, blow molded bottles, coextruded sheet which can be thermoformed into containers, coatings on glass bottles or wood or metal or even to join two metals, either the same metal or dissimilar metals, into a lamination.

In preparing the blends in the following examples, any blending equipment or technique may be used.

All blends preferably contain an antioxidant package.

In most of the specific examples, blends were prepared in an electrically heated Brabender plasticorder mixer using a scroll type mixer under the following conditions: 400° F., rotor speed of 120 rpm, and total mixing time is 10 minutes.

The resultant blends were then compression molded into films approximately 0.006 inches thick at 350° F. The films were then pressed to the substrate in a Sentinel heat sealer (Model 12 or 12AS) at 40 psi pressure. The temperature and time of sealing are varied according to the conditions desired. The sample is 1 inch in width, the sealing area is 1 square inch. The separation rate is 5 inches per minute. The maximum peeling load after the initial peak in lbs. per inch of specimen length is reported. The average of 5 specimens is taken as the T-peel strength of the adhesive bond. The test angle is 180°.

The procedure herein described is related to ASTM D 1876 (re-appearance 1978) with the following differences:
1. The test panel in ASTM D 1876-72—12 inches long by 6 inches wide. The first 3 inches of length are bent back to form a 90° bend.
2. The peel strength is determined from the autographic curve for the first 5 inches of peeling after the initial peak.
3. The average peeling load in lbs/in of the specimen width required to separate the adherent is reported.

EXAMPLES

EXAMPLES 1-6

An electrically heated Brabender mixing unit was used for blending various weight ratios of a high density polyethylene (HDPE) of a melt index 0.1 g/10 min. and a density of 0.944 g/cc, a polypropylene (PP) of melt index 0.54 g/10 min. and a density of 0.9 g/cc, a linear low density polyethylene (LLDPE) of a melt index of 2.5 g/10 min. and a density of 0.918 g/cc and a high density polyethylene (HDPEg) grafted with x-methyl bicyclo(2.2.1)hept-5-ene-2,3-dicarboxylic acid anhydride, such that the grafted high density polyethylene has a melt index of 1.5 g/10 min. and a graft level of 1.5 wt.%. The blends were tested for adhesion to films of ethylene-vinyl alcohol copolymer (EVOH) and aluminum (Al) with a heat sealer set at 430° F. for 1 sec. and to propylene (PP) film at 500° F., 5 sec. The results obtained for each of the various compositions are listed below:

| Example No. | Percentage of Blend | | | | Adhesion to EVOH (lbs/in) | Adhesion to Al (lbs/in) | Adhesion to PP (lbs/in) |
| --- | --- | --- | --- | --- | --- | --- | --- |
| | HDPE | LLDPE | PP | HDPEg | | | |
| 1 | 40 | 10 | 30 | 20 | 1.6 | — | — |
| 2 | 40 | 30 | 10 | 20 | 1.5 | — | — |
| 3 | 45 | 15 | 30 | 10 | 1.6 | — | — |
| 4 | 45 | 30 | 10 | 15 | 1.8 | — | — |
| 5 | 40 | 20 | 20 | 20 | 5.9 | 6.1 | 0.9 |
| 6 | 10 | 35 | 35 | 20 | >7.0$^{FT}$ | 4.7 | 1.4 |

FT = film tear

EXAMPLE 7

In addition to the grafted high density polyethylene in the examples above, a linear low density polyethylene grafted with x-methyl bicyclo(2.2.1)hept-5-ene-2,3-dicarboxylic acid anhydride (LLDPEg) was used. All the other components used for this example are the same as those used for Example 5. The heat sealing to ethylene vinyl alcohol (EVOH) copolymer films was carried out with the sealer set at 430° F. and 1 sec. and the adhesion levels obtained are given below:

| Example No. | Percentage in Blend | | | | | Adhesion to EVOH (lbs/in) |
| --- | --- | --- | --- | --- | --- | --- |
| | HDPE | LLDPE | PP | HDPEg | LLDPEg | |
| 7 | 40 | 20 | 20 | 10 | 10 | 5.9 |

EXAMPLES 8-10

The high density polyethylene used in Examples 1-6 was replaced by another high density polyethylene which had a melt index of 2.7 g/10 min. and a density of 0.958 g/cc. The blends were prepared as in Example 1 and heat sealed to ethylene-vinyl alcohol copolymer (EVOH) and HDPE films with the sealer set at 430° F. and 1 sec. The adhesion data in lbs/in. is given below for each of the blends:

| Example | Percentage in Blend | | | | Adhesion to | |
| --- | --- | --- | --- | --- | --- | --- |
| No. | HDPE | LLDPE | PP | HDPEg | EVOH | HDPE |
| 8 | 40 | 30 | 10 | 20 | 2.4 | >10.0$^{CNS}$ |
| 9 | 40 | 10 | 30 | 20 | >3.1$^{FT}$ | >8.0$^{CNS}$ |
| 10 | 40 | 20 | 20 | 20 | >4.0$^{FT}$ | >7.6$^{CNS}$ |

FT = film tear
CNS = Could Not Separate

EXAMPLE 11

The linear low density polyethylene component was changed to one that had a melt index of 1 g/10 min. and a density of 0.924 g/cc. The ratios and the other components used were the same as in Example 5. The adhesion to EVOH film when heat sealed at 430° F. and 1 sec. was 1.5 lbs/in. and was 2.3 lbs/in. when heat sealed to a nylon 6 film under the same sealer setting conditions.

EXAMPLE 12

When the high density polyethylene in Example 10 was replaced by another with a density of 0.960 g/cc and a melt index of 1.0 g/10 min. The adhesions to EVOH film and nylon 6 film were 3.7 and 2.9 lbs/in. respectively when the heat sealer was set at 430° F. and 1 sec.

EXAMPLES 13–16

An electrically heated Brabender mixing unit was used for blending various weight ratios of a high density polyethylene (HDPE) of melt index 1.0 g/10 min. and of density 0.960 g/cc, a polypropylene (PP) of melt index 0.54 g/10 min. and a density of 0.9 g/cc, a linear low density polyethylene (LLDPE) of density 0.919 g/cc and melt index 1.9 g/10 min. and a high density polyethylene (HDPEg) grafted with x-methyl bicyclo(2.2.1)hept-5-ene-2,3-dicarboxylic anhydride such that the grafted HDPE had a melt index of 1.5 g/10 min. and a graft level of 1.5 wt.%. The blends were tested for adhesion after heat-sealing to films of nylon 6 and ethylene-vinyl alcohol (EVOH) copolymers at 430° F. and 1 sec. and to a film of polypropylene at 500° F. for 5 sec. The results in lbs/in. are given below for the various blends prepared.

| Example | | | | | Adhesion to | | |
| --- | --- | --- | --- | --- | --- | --- | --- |
| No. | HDPE | LLDPE | PP | HDPEg | EVOH | Nylon | PP |
| 13 | 10 | 40 | 40 | 10 | 2.9 | 3.9 | 2.9 |
| 14 | 10 | 40 | 30 | 20 | 2.4 | >4.3$^{FT}$ | 0.7 |
| 15 | 10 | 30 | 40 | 20 | 0.9 | 3.1 | 2.5 |
| 16 | 40 | 20 | 20 | 20 | 0.6 | 3.3 | 1.0 |

FT = film tear

EXAMPLE 17

A blend, similar to that in Example 11 except prepared on a large Banbury mixing unit, was coextruded separately with polypropylene block copolymer resin and with ethylene-vinyl alcohol copolymer. With the polypropylene block copolymer, the adhesion obtained was 2.2 lbs/in with an elongation, while with ethylene-vinyl alcohol copolymer, the blend gave an adhesion value of 2.6 lbs/in.

EXAMPLE 18

A blend, similar to that in Example 11 except that the linear low density polyethylene was substituted by branched low density polyethylene of density 0.922 g/cc and of melt index 2.0 g/10 min. The adhesion obtained when heat-sealed to an ethylene-vinyl alcohol copolymer film with the heat sealer set at 430° F. and 1 sec. was 3.3 lbs/in. The same blend gave 6.0 lbs/in with film tear when tested to an ethylene-vinyl alcohol copolymer film with the heat-sealer set at 500° F. and 1 sec.

Glossary of Terms

EVOH—ethylene-vinyl alcohol copolymer
HDPE—high density polyethylene
LDPE—low density polyethylene
LLDPE—linear low density polyethylene
HDPEg—HDPE graft copolymer
LLDPEg—LLDPE graft copolymer
PP—polypropylene

I claim:
1. A composite structure comprising:
   (A) a substrate, and adhered thereto
   (B) a modified polyolefin blend consisting essentially of:
      (i) HDPE having a density of about 0.94–0.97 g/cc;
      (ii) at least one polypropylene polymer or copolymer;
      (iii) LDPE having a density of about 0.91–0.94 g/cc; and
      (iv) a polyethylene polymer grafted with at least one grafting monomer polymerizable ethylenically unsaturated carboxylic acid or acid derivative.
2. The composite structure of claim 1 wherein said substrate comprises polar polymers, solid metals, glass, paper, wood or cellophane.
3. The composite structure of claim 1 wherein said substrate comprises nylon.
4. The composite structure of claim 1 wherein said substrate comprises ionomer.
5. The composite structure of claim 1 wherein said substrate comprises aluminum.
6. The composite structure of claim 1 wherein said substrate comprises polyolefin.
7. The composite structure of claim 1 wherein said propylene polymer or copolymer comprises propylene homopolymers and copolymers of propylene and one or more unsaturated aliphatic hydrocarbons.
8. The composite structure of claim 1 wherein said polypropylene polymer comprises a copolymer of propylene and ethylene.
9. The composite structure of claim 1 wherein said grafting monomer comprises at least one of acrylic acid, methacrylic acid, fumaric acid, maleic acid, itaconic acid, citraconic acid, mesaconic acid, maleic anhydride, 4-methyl cyclohex-4-ene-1,2-dicarboxylic acid anhydride, bicyclo(2.2.2)oct-5-ene-2,3-dicarboxylic acid anhydride, 1,2,3,4,5,8,9,10-octahydronaphthalene-2,3-dicarboxylic acid anhydride, 2-oxa-1,3-diketospiro(4.4)-non-7-ene, bicyclo(2.2.1)hept-5-ene-2,3-dicarboyxlic acid anhydride, maleopimaric acid, tetrahydrophthalic anhydride, norborn-5-ene-2,3-dicarboxylic acid anhydride, Nadic anhydride, methyl Nadic anhydride, Himic anhydride, methyl Himic anhydride, and x-methyl bicyclo(2.2.1)hept-5-ene-2,3-dicarboxylic acid anhydride.
10. The composite structure of claim 1 wherein said unsaturated or saturated carboxylic acids or acid derivatives of (iv) comprise the acids, metal salts of said acids, acid esters, acid anhydrides, acid amines, acid halides and acid derivatives or aliphatic alicyclic, aromatic fused ring, heterocyclic moieties and copolymers containing one or more of these groups.

11. The composite structure of claim 1 wherein the polyethylene of (iv) comprises ethylene homopolymers and copolymers of ethylene with one or more of butene, hexene, octene, 4-methyl pentene-1 or other unsaturated aliphatic or aromatic hydrocarbons in the density range of 0.91 to 0.97 g/cc.

12. The composite structure of claim 11 wherein the polyolefin of (iv) comprises linear polyethylenes.

13. The composite structure of claim 1 wherein said HDPE of (i) comprises an ethylene homopolymer and copolymers of ethylene with olefin monomers containing 3–15 carbon atoms.

14. The composite structure of claim 13 wherein said HDPE has a density of about 0.94–0.97 g/cc and a melt index of about 0.01–50 g/10 min.

15. The composite structure of claim 1 wherein the propylene polymer of (ii) comprises propylene homopolymers, copolymers or terpolymers containing less than 40% of a polymerizable comonomer.

16. The composite structure of claim 1 wherein said LDPE of (iii) comprises high pressure low density polyethylene or low pressure linear low density polyethylene, each having a density of about 0.91–0.94 g/cc and a melt index of 1.0–50 g/10 min.

17. The composite structure of claim 1 wherein said substrate comprises ethylene-vinyl alcohol copolymer.

18. A composite structure comprising:
  (A) two or more substrates with adjacent pairs adhered together by
  (B) an intervening layer of a modified polyolefin blend consisting essentially of:
    (i) HDPE having a density of about 0.94–0.97 g/cc;
    (ii) at least one polypropylene polymer or copolymer;
    (iii) LDPE having a density of about 0.91–0.94 g/cc; and
    (iv) a polyethylene polymer grafted with at least one grafting monomer polymerizable ethylenically unsaturated carboxylic acid or acid derivative.

19. The composite structure of claim 18 wherein said (A) comprises polypropylene and a polar substrate.

20. The composite structure of claim 18 wherein said (A) comprises polyethylene and a polar substrate.

21. The composite structure of claim 18 wherein said (A) comprises polypropylene and nylon.

22. The composite structure of claim 18 wherein said (A) comprises polyethylene and nylon.

23. The composite structure of claim 18 wherein said (A) comprises polypropylene and ethylene-vinyl alcohol copolymer.

24. The composite structure of claim 18 wherein said (A) comprises polyethylene and ethylene-vinyl alcohol.

25. The composite structure of claim 18 wherein said (A) comprises polypropylene and aluminum.

26. The composite structure of claim 18 wherein said (A) comprises polyethylene and aluminum.

27. The composite structure of claim 18 wherein said (A) comprises polar substrates.

28. The composite structure of claim 18 wherein said propylene polymer or copolymer comprises propylene homopolymers and copolymers of propylene and one or more unsaturated aliphatic hydrocarbons.

29. The composite structure of claim 18 wherein said polypropylene polymer comprises a copolymer of propylene and ethylene.

30. The composite structure of claim 18 wherein said grafting monomer comprises at least one of acrylic acid, methacrylic acid, fumaric acid, maleic acid, itaconic acid, citraconic acid, mesaconic acid, maleic anhydride, 4-methyl cyclohex-4-ene-1,2-dicarboxylic acid anhydride, bicyclo(2.2.2)oct-5-ene-2,3-dicarboxylic acid anhydride, 1,2,3,4,5,8,9,10-octahydronaphthalene-2,3-dicarboxylic acid anhydride, 2-oxa-1,3-diketospiro(4.4)-non-7-ene, bicyclo(2.2.2)hept-5-ene-2,3-dicarboxylic acid anhydride, maleopimaric acid, tetrahydrophthalic anhydride, norborn-5-ene-2,3-dicarboxylic acid anhydride, Nadic anhydride, methyl Nadic anhydride, Himic anhydride, methyl Himic anhydride, and x-methyl bicyclo(2.2.1)hept-5-ene-2,3-dicarboxylic acid anhydride.

31. The composite structure of claim 18 wherein said unsaturated or saturated carboxylic acids or acid derivatives of (iv) comprise the acids, metal salts of said acids, acid esters, acid anhydrides, acid amines, acid halides and acid derivatives or aliphatic alicyclic, aromatic fused ring, heterocyclic moieties and copolymers containing one or more of these groups.

32. The composite structure of claim 18 wherein the polyethylene of (iv) comprises ethylene homopolymers and copolymers of ethylene with one or more of butene, hexene, octene, 4-methyl pentene-1 or other unsaturated aliphatic or aromatic hydrocarbons in the density range 0.91 to 0.97 g/cc.

33. The composite structure of claim 32 wherein the polyethylene of (iv) comprises linear polyethylenes.

34. The composite structure of claim 18 wherein said HDPE of (i) comprises an ethylene homopolymer and copolymers of ethylene with olefin monomers containing 3–15 carbon atoms.

35. The composite structure of claim 34 wherein said HDPE has a density of about 0.94–0.97 g/cc and a melt index of about 0.01–50 g/10 min.

36. The composite structure of claim 18 wherein the propylene polymer of (ii) comprises propylene homopolymers, copolymers or terpolymers containing less than 40% of a polymerizable comonomer.

37. The composite structure of claim 18 wherein said LDPE of (iii) comprises high pressure low density polyethylene or low pressure linear low density polyethylene, each having a density of about 0.91–0.94 g/cc and a melt index of 1.0–50 g/10 min.

* * * * *